(12) United States Patent
Lin et al.

(10) Patent No.: US 6,323,258 B1
(45) Date of Patent: Nov. 27, 2001

(54) WATER FAST INK JET PRINT USING AQUEOUS INK JET INK

(75) Inventors: An-Chung Robert Lin, Cupertino; Howard S. Tom, San Jose, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/099,678

(22) Filed: Jun. 18, 1998

Related U.S. Application Data

(63) Continuation-in-part of application No. 08/676,707, filed on Jul. 8, 1996, now abandoned.

(51) Int. Cl.$^7$ ................................................. C09D 11/10
(52) U.S. Cl. .................... 523/161; 524/505; 106/31.26; 106/31.27; 260/DIG. 38
(58) Field of Search .................... 523/161; 260/DIG. 38; 524/505; 106/31.26, 31.27

(56) References Cited

U.S. PATENT DOCUMENTS

| | | | |
|---|---|---|---|
| 5,067,980 | * 11/1991 | Koike et al. | 106/22 |
| 5,108,505 | 4/1992 | Moffat | 106/31.36 |
| 5,226,957 | * 7/1993 | Wickramanayake et al. | 106/31.26 |
| 6,174,354 | * 1/2001 | Takizawa et al. | 106/31.43 |

FOREIGN PATENT DOCUMENTS

| | | | |
|---|---|---|---|
| 3438272A | 5/1985 | (DE) | C09D/11/00 |
| 0273718A | 7/1988 | (EP) | C09D/11/00 |
| 00294124A | 12/1988 | (EP) | C09D/11/00 |
| 0562732A | 9/1993 | (EP) | C09D/11/00 |
| 0595523A | 5/1994 | (EP) | C09D/11/00 |
| 0671447A | 9/1995 | (EP) | C09D/11/00 |
| 0719846A | 7/1996 | (EP) | C09D/11/00 |

\* cited by examiner

*Primary Examiner*—Terrel Morris
*Assistant Examiner*—John Guarriello

(57) ABSTRACT

An aqueous ink composition having insoluble dye dispersed uniformly throughout by means of a coupling/dispersive (dual function) agent. The coupling/dispersive agent is characterized by association with insoluble dye molecules as well as by solubilization in a water based carrier medium. The resulting ink is water fast because the coupling/dispersive agent probably evaporates during drying or migrates away.

12 Claims, 1 Drawing Sheet

WATER FAST INK JET PRINT USING AQUEOUS INK JET INK

Continuation-in-part (CIP) of prior application Ser. No. 08/676,707 filed on Jul. 8, 1996 now abandoned.

BACKGROUND OF THE INVENTION

1. Field of the Invention

This invention relates to inks, and in particular aqueous inks comprising water insoluble dyes.

2. Description of Related Art

Dyes in some aspects are superior to pigments in ink jet inks for a number of well-known reasons. Pigment particles are about a million times larger than dye molecules. Pigment based inks are, basically, finely ground particles suspended in a transfer medium. The much smaller dye molecules may, under the appropriate conditions, dissolve in a medium as compared with mere physical suspension. It is well known that, owing to its molecular characteristics, dye produces colors spanning a broader range, colors which are truer or otherwise more reproducible, and colors of greater strength. However, water soluble dyes smear and fade after printing. Smearing and fading are, in most applications, highly undesirable characteristics and present severe limitations on the usefulness of dye inks in everyday printer use.

What is still needed is one or more water insoluble dyes dissolved in an aqueous-based ink vehicle. This dye-based ink would enable a greatly expanded range of water-fast, non-smearing, highly saturated colors with high reproduceability and long shelf life. The ink composition of the present invention is useful in ink jet printing, enabling color consistency over a broad range and suitable, owing to non-smearing and non-fading properties, for archival purposes.

BRIEF SUMMARY OF THE INVENTION

The invention taught herein provides a homogeneous ink-vehicle system comprising a water insoluble dye, a coupling/dispersive agent (CDA), and an aqueous vehicle. The invention further provides a coupling - dispersive agent associated at a first molecular site or a region with a water insoluble dye, and said agent is associated at a second site or region with water.

Ink is made by dissolving dye in solvent, then adding the coupling/dispersive agent. The dye interacts first with the coupling/dispersive agent. After the dye has interacted with the dispersant, water is added to the dye solution. The coupling/dispersive agent having a hydrophilic molecular site or region then interacts with water. This association of the coupling/dispersive agent with, as to one functional group or reactive site or region, the dye, and as to another, the water, results in the dissolution of the water-insoluble dye in water. Ink provided by and according to the invention taught herein is suitable for use in many printer types and will adhere upon drying to most cellulose based papers. Once dry upon a medium such as paper or organic polymer, the ink, even if re-wetted, will not smear possibly because the coupling/dispersive agent evaporates or migrates away as the ink dries and the dried ink, without the coupling/dispersive agent, is insoluble in water.

DETAILED DESCRIPTION OF THE INVENTION

Figure 1:
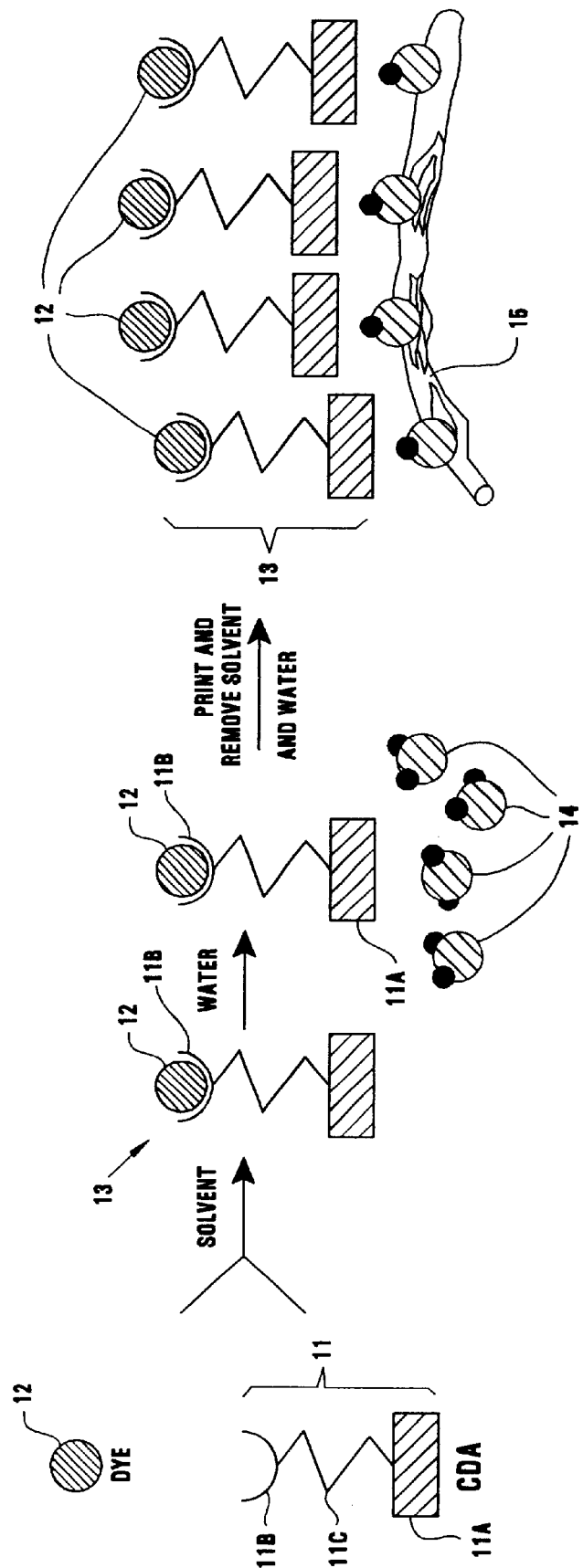
FIG. 1 is a schematic representation of the method of solubilizing the insoluble ink using the agent, and drying of the printed ink.

The invention taught herein provides a homogeneous ink-vehicle system comprising a water insoluble dye, a coupling/dispersive agent, and water. The coupling/dispersive agent is a compound having at least 2 different reactive or interactive sites or more sites. It can therefore be described as a multifunctional (i.e. dual) compound since it has at least 2 functional groups. The invention further provides a water insoluble dye associated with an coupling/dispersive agent by coupling/dispersive agent is meant a compound with at least two functional groups or reactive sites or regions, one such group, site or region assisting in water solubility, and another associating with the dye. The dye and coupling/dispersive agent were associated through Van Der Weal's forces. The insoluble dye may be any of the large variety of dyes known to be insoluble in water. Specific examples are provided below. The aqueous vehicle is largely water, and typically deionized water. Other ingredients, such as isopropyl alcohol, may be included in the aqueous vehicle, depending on desired ink characteristics and also, of course, on the type of printer for which a given ink is formulated and all factors generally considered by ink system designers. The aqueous vehicle also generally includes solvent (diethylene glycol, for example) either incorporated from the solubilization of the solid dye powder, or added in order to accommodate of other factors, including ink system design considerations. Typically the aqueous vehicle is present in the major amount of the ink composition, in the range of 10 to 95 percent, and preferably approximately 50 to 90 percent based on total weight of the ink.

The coupling/dispersive agent is selected from the group of compounds that exhibit both the capacity for dye association as well as the characteristics of dissolving in water. While many compounds may be identified as demonstrating these capacities and characteristics, the specific embodiments provided herein are of two basic types.

One embodiment includes a coupling/dispersive agent comprising a short backbone of fewer than several dozen carbons in a chain, with the preferred length being 4 to 6 carbons. Satisfactory compounds include a carboxylic acid or a phosphonic acid. It is thought that one end of these phenyl groups forms a van der Waals attraction to the insoluble dye molecules. The other end COOH, easily dissolves with surrounding aqueous vehicle (the major part of which is water, as described hereinabove). The term "end" is used herein to describe the situation that the reactive or functional groups, sites, or regions are either terminal groups or otherwise somehow spatially distinct. It is not meant to be strictly construed to limit the compounds taught by the invention. Rather, the invention provides for dual functionally the coupling dispersive agent: that of both coupling with the dye and that of dispersing in water. The examples provided herein are believed to form associations on a molecular level, one dye molecule per coupling/dispersive molecule, and this homogeneity facilitates ink performance.

The second eligible coupling/dispersive agent provided by the invention is a much larger molecule generally in the range of 15–25 monomer units, and typically an acrylic. The preferred embodiment provided herein teaches the use of a short acrylic commercially known as JONCRYL '682. Joncryl is a low molecular weight (1700) acrylic resin available from SC Johnson Polymer of Racine, Wis.

The invention taught herein provides a method for making an improved ink composition. The method of ink according to the present invention includes the steps of: selecting a dye; selecting a solvent; and dissolving the dye in the solvent. Adding a preselected coupling/dispersive agent to the solution of dye dissolved in solvent. The preselection of coupling/dispersive agent is from the group of molecules having at least two functional groups. (The term functional group as used herein means any identifiable site, region or functional structure that contributes to the associative process). The first functional group is pre-selected for dye associative properties, with pi-electrons from an aromatic ring, or other electrostatic force, such as ionic forces, enhancing association of the functional group with dye molecules.

The second functional group is pre-selected for solubility in water typically arising out of easy formation of ionic or hydrogen bonds and may be selected from a range of carboxylic, phosphonic or other acidic groups.

Upon addition, the solubilized dye interacts with the coupling/dispersive agent; most particularly, with a so-called first functional group of the coupling/dispersive agent. After dye has interacted with the coupling/dispersive agent, the aqueous vehicle is added to the dye/coupling dispersive agent solution. The coupling/dispersive agent then interacts with the molecules in the aqueous vehicle through a second functional group.

This association of the coupling/dispersive agent with, as to one functional group, the dye, and as to the other functional group, the water, results in the dissolution of the water insoluble dye in water.

In preferred embodiment, the coupling/dispersive agent selected was an acrylic resin solution commercially available as JONCRYL 61LV, (composed in large part of JONCRYL '678, a low molecular weight acrylic resin) or a solution of JONCRYL '682 (a low molecular weight styrenated acrylic resin supplied in flake form). These polymers are estimated to have about 15 to 20 monomer units. It is thought that because the polymer is not long enough to wrap around the dye molecule, it associates with the dye by Van der Waals forces. The other end of the polymer has a water soluble ionic group such as an acid. In preferred embodiment, an ink solution with a roughly one-to-one ratio of polymer to dye (where the dye has a molecular weight of about 800) was used and printed using an HP DeskJet printer.

The ink was composed of ORASOL Pink (water in soluble) 1.3%; aqueous vehicle 83%; JONCRYL 61LV, 6.7%; and isopropyl alcohol 9%. The ink has a viscosity of 7.5 cps and was printed with a DeskJet pen. A variety of coupling/dispersive agents with structures similar to the monomer (functional group) of the Joncryl polymer were used.

Phenyl groups associate well with dye and acid groups provide good solubility in water.

| | Examples: | |
|---|---|---|
| dye: | ORASOL Pink 1.5 | |
| Solvent: | Diethylene Glycol 6 | |
| coupling/dispersive agent: | 4-phenyl butyric acid | 5 or |
| | 6 phenyl hexanoic acid | 5 or |
| | 4-bromophenyl acetic acid | 5 or |
| | 4-bromophenyl boronic acid | 5 or |
| | 4 amino benzyl phosphonic acid | 5 |
| aqueous vehicle: | water 87.5 | |
| Different colors include: | | |
| Example 1: | | |

Magenta Ink
OROSOL pink 1.3
Diethylene glycol 5.2

-continued

Examples:

JONCRYL 682 5.0
Water 88.5
Surface tension 40(Dyne/cm)
Viscosity (cps) 2.1
Example 2:

Yellow Ink
IOSOL yellow 2
diethylene glycol 8
JONCRYL 682 10
water 80.0
Surface tension 36 (Dyne/cm)
Viscosity (cps) 2.8
Example 3

Cyan Ink
ORASOL blue 4.0
JONCRYL 682 10
diethylene glycol 16
water 70
surface tension 37
Vis (cps) 5.1

Print samples were generated using the HP DeskJet printer. Ink water-fastness was measured by paper chromatography and indicated little or no migration with water. The ink according to the invention taught herein has higher affinity to the paper fiber (cellulose) than to water. The terminal polar group of the coupling/dispersant backbone to the hydroxyl group in the cellulose upon drying; the strength of the bond between the cellulose and the terminal polar group prevents smearing upon rewetting.

Referring now to FIG. 1 is shown the method of solubilization and the water-fast qualities of the dried ink on the substrate. The coupling/dispersive agent (CDA) 11 (having a hydrophilic region or portion 11A and a hydrophobic region or portion 11B connected by an organic linking group 11C) is first dissolved in an organic solvent. This solution is then contacted with water insoluble dye 12 (usually in an organic solvent). Dye 12 interacts with a suitable portion 11B of the agent producing an associated moiety 13. Water is then added and the agent bonded to the water-insoluble dye as moiety 13 remains in the aqueous solution. The aqueous solution of the ink is sprayed (printed) onto a substrate such as paper.

The water and solvent evaporates quickly and the agent 11 bonds to the substrate 15. Since the agent 11 is now bonded to the substrate with agent 11 and dye 12 are both water insoluble, the printed ink is now water fast on the substrate 15.

Alternate Embodiments

The ink taught herein is not limited to water insoluble dye. The coupling/dispersant agent may be pre-selected for dye in combination with a non-aqueous solvent, such as isopropyl alcohol (IPA). Moreover, rather than paper fiber (cellulose) the substrate affinity replacing solvent bonding may vary widely polar forces are useful in bonding the dye to many surfaces including metallic surfaces such as aluminum cans and the like.

In sum, the invention taught herein provides ink of good transparency. The ink is easy to manufacture because no pigment grinding is required and there are no particle size distribution complications. The ink-vehicle system is flexible accommodating a variety of dye based inks, various coupling/dispersant components as well as wide range of ink-substrate end products. The resulting ink-substrate coupling is non-smearing and water (or solvent) fast. The ink eliminates the problems of dispersing pigment in "ink jet" ink, and, because of adequate binding characteristics, is more robust than systems dependent on or sensitive to the ink vehicle.

While only a few embodiments of the present invention have been shown and described herein, it is apparent to those skilled in the art that various modifications and changes can be made in the novel components of this water-fast ink jet ink and the method to produce water-fast inkjet print without departing from the spirit and scope of the present invention. All such modifications and changes coming within the scope of the appended claims are intended to be covered thereby.

What is claimed is:

1. An ink composition comprising an insoluble dye, a coupling/dispersive agent, and an aqueous vehicle, wherein the coupling/dispersive agent is selected from the group consisting of carboxylic acids having between 4 and 6 carbons in a chain and at least one phenyl group attached to the chain, phosphonic acids having between 4 and 6 carbons in a chain and at least one phenyl group attached to the chain, and acrylic resins.

2. The ink composition of claim 1 wherein the acrylic resins have from 5 to 25 monomer units.

3. The ink composition of claim 2 wherein the acrylic resins have from 15 to 25 monomer units.

4. An ink composition comprising:
   a) 1 to 15 parts by weight of an insoluble dye of 100 parts by weight of the total composition;
   b) 1 to 20 parts by weight of dye solvent of 100 parts by weight of the total composition;
   c) 1 to 30 parts by weight of a coupling/dispersive agent based on 100 parts by weight of the total composition; and
   d) the remainder of the 100 parts being made up of an aqueous vehicle; wherein the coupling/dispersive agent is selected from the group consisting of carboxylic acids having between 4 and 6 carbons in a chain and at least one phenyl group attached to the chain, phosphonic acids having between 4 and 6 carbons in a chain and at least one phenyl group attached to the chain, and acrylic resins.

5. The ink composition of claim 4 wherein the acrylic resins have from 5 to 25 monomer units.

6. The ink composition of claim 5 wherein the acrylic resins have from 15 to 25 monomer units.

7. A water-fast coloring composition comprising:
   a) from about 1 to 30 parts by weight a combination of insoluble dye and solvent;
   b) from about 1 to 30 parts by weight of a coupling/dispersive agent;
   c) remainder of the 100 parts comprised of an aqueous vehicle, said vehicle including water and such additives desirable to achieve satisfactory color composition performance; wherein the coupling/dispersive agent is selected from the group consisting of carboxylic acids having between 4 and 6 carbons in a chain and at least one phenyl group attached to the chain, phosphonic acids having between 4 and 6 carbons in a chain and at least one phenyl group attached to the chain, and acrylic resins.

8. The ink composition of claim 7 wherein the acrylic resins have from 5 to 25 monomer units.

9. The ink composition of claim 8 wherein the acrylic resins have from 15 to 25 monomer units.

10. A method of preparing a water-fast coloring composition comprising the steps of:
    a) providing an insoluble dye;
    b) providing a solvent for said dye;
    c) dissolving said dye in said solvent to form a dissolved dye;
    d) providing a coupling/dispersive agent;
    e) mixing said dissolved dye with said coupling/dispersive agent under conditions to form an attraction between the first functional group of said coupling/dispersive agent and said dissolved dye molecules;
    f) providing an aqueous vehicle comprising water and optionally alcohols and glycols;
    g) combining the product of step e with said aqueous vehicle,
    wherein the coupling/dispersive agent is selected from the group consisting of carboxylic acids having between 4 and 6 carbons in a chain and at least one phenyl group attached to the chain, phosphonic acids having between 4 and 6 carbons in a chain and at least one phenyl group attached to the chain, and acrylic resins.

11. The method of claim 10 wherein the acrylic resins have from 5 to 25 monomer units.

12. The method of claim 11 wherein the acrylic resins have from 15 to 25 monomer units.

* * * * *